(12) United States Patent
Wills et al.

(10) Patent No.: US 11,470,534 B2
(45) Date of Patent: Oct. 11, 2022

(54) SYSTEM AND METHODS FOR EVALUATING BACKHAUL OF WIRELESS SITES USING EXPANDABLE PATH SEARCH RINGS

(71) Applicant: Wireless Applications Corp., Bellevue, WA (US)

(72) Inventors: Eric Wills, Bellevue, WA (US); Abdelelah M. Salama, Bellevue, WA (US); Matthew R. Parzyk, Bellevue, WA (US)

(73) Assignee: Wireless Applications Corp., Bellevue, WA (US)

( * ) Notice: Subject to any disclaimer, the term of this patent is extended or adjusted under 35 U.S.C. 154(b) by 0 days.

(21) Appl. No.: 17/148,966

(22) Filed: Jan. 14, 2021

(65) Prior Publication Data

US 2021/0144615 A1    May 13, 2021

Related U.S. Application Data

(63) Continuation of application No. 16/713,379, filed on Dec. 13, 2019, now Pat. No. 10,945,189.

(60) Provisional application No. 62/894,443, filed on Aug. 30, 2019.

(51) Int. Cl.
*H04Q 3/00* (2006.01)
*H04W 16/18* (2009.01)
*H04W 40/06* (2009.01)
*H04W 84/00* (2009.01)
*H04W 24/00* (2009.01)

(52) U.S. Cl.
CPC .......... *H04W 40/06* (2013.01); *H04W 16/18* (2013.01); *H04W 24/00* (2013.01); *H04W 84/00* (2013.01)

(58) Field of Classification Search
None
See application file for complete search history.

(56) References Cited

U.S. PATENT DOCUMENTS

| 10,945,189 | B1 * | 3/2021 | Wills | H04W 16/18 |
| 2014/0213263 | A1 * | 7/2014 | Ryan | H04W 36/04 |
|  |  |  |  | 455/437 |
| 2018/0352309 | A1 * | 12/2018 | Hopcraft | H04W 16/18 |

* cited by examiner

*Primary Examiner* — Gary Lafontant
(74) *Attorney, Agent, or Firm* — Perkins Coie LLP

(57) ABSTRACT

The disclosed technology provides a system and method for evaluating candidate wireless sites within path search rings around centerpoints or new potential sites based on a portfolio of centerpoints, a portfolio of candidate sites, a variable radius of the path search rings, and a variable number of target candidates or paths sought within each path search ring, where the system and method computes radio path properties between the centerpoints and candidate sites and visually depicts bounding rings around centerpoints based on whether the target number of viable candidates or paths exist within the path search ring.

20 Claims, 5 Drawing Sheets

SYSTEM AND METHODS FOR EVALUATING BACKHAUL OF WIRELESS SITES USING EXPANDABLE PATH SEARCH RINGS

CROSS-REFERENCE TO RELATED APPLICATIONS

This application is a continuation of U.S. patent application Ser. No. 16/713,379, entitled "SYSTEM AND METHODS FOR EVALUATING BACKHAUL OF WIRELESS SITES USING EXPANDABLE PATH SEARCH RINGS," filed on Dec. 13, 2019, which claims priority to and benefit from U.S. Provisional Patent Application No. 62/894,443, entitled "SYSTEM AND METHODS FOR EVALUATING SITES USING EXPANDABLE WIRELESS SEARCH RINGS," filed on Aug. 30, 2019, which is hereby incorporated by reference in its entirety.

BACKGROUND

With the ever-increasing demands on capacity and coverage placed on wireless communication networks, it is getting increasingly difficult to locate new viable sites to install wireless equipment, for example, to plug coverage holes or improve capacity. When a network operator (e.g., a cellular network operator) determines that a new wireless tower site is needed in an area, they typically identify a bounded region or shape where the new site could be located to provide the best coverage. Site acquisition specialists then survey potential sites within the bounded region or shape to find the most ideal new location, for example, a site with existing infrastructure, that meets coverage goals, has a preferred backhaul method, is available for lease or purchase, or has no restrictions on erecting towers, etc. Network operators prefer to leverage their existing sites for backhaul to those new sites. Having existing infrastructure like fiber, or other accommodating microwave network capacities, to fulfill the network operators' network needs for the new sites is desirable and allows for rapid network deployment. Site acquisition becomes increasingly complex particularly where network operators have a large portfolio of existing sites, need coverage from multiple potential new sites (requiring wider search areas), need coverage in urban areas with building obstructions or areas with terrain constraints. Because there can be hundreds of new potential sites, a speedy identification of the viable sites requires substantial automation in order to meet time to market pressure. There is therefore a need for a wireless design and site analysis tool that can efficiently and accurately aid site acquisition specialists and RF engineers in locating which existing candidates within new site backhaul search areas provide the best and most efficient solutions for backhaul into the network operators' existing network infrastructure.

DETAILED DESCRIPTION

Figure 1:
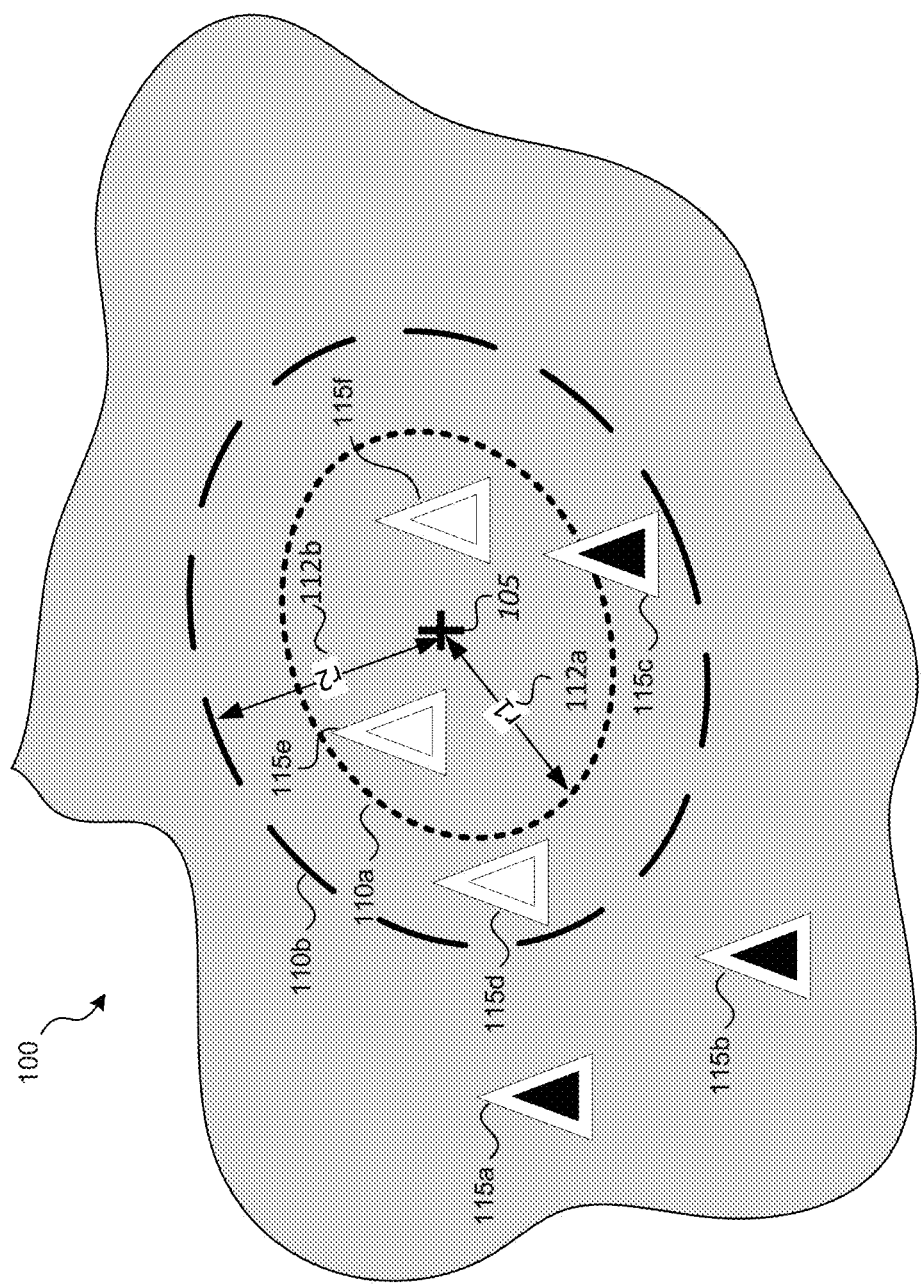
FIG. 1 is an illustration of a representative map depicting path search rings for evaluating new wireless sites.

The disclosed technology provides systems and methods for evaluating wireless sites within expandable backhaul/path search rings for microwave links. In an embodiments of the disclosed technology, a wireless design and site backhaul analysis tool receives two datasets and a set of analysis criteria. The first dataset is a portfolio indicating map coordinates, heights and other properties of the locations for potential new sites (the "centerpoint sites" or "centerpoints"). The second dataset is a portfolio indicating map coordinates and other properties of existing sites (the "candidate" sites for backhaul). The existing sites can include telecommunications infrastructure that can provide backhaul for the new sites into the existing network, enabled, for example, by a microwave link from a new site to an existing site.

The disclosed technology can be used to efficiently analyze potential wireless backhaul between sites in multiple datasets containing site coordinates. For example, the disclosed technology can be used to analyze properties of the wireless or microwave links between sites in a first dataset and sites in a second dataset to determine what backhaul options exist for each site in the first dataset to each site in the second dataset. However, for convenience, the disclosed technology is described using representative embodiments with two core datasets, where a first dataset is described as a portfolio of a network operator's current on-air wireless sites ("existing sites"), and a second dataset is described as targeted new locations or as a search ring portfolio containing centerpoint candidates.

The analysis criteria of the disclosed technology can include an indication of a maximum targeted microwave link count per search radius, an indication of the maximum distance per path to be tested, the frequency of the microwave link, the terrain model, the required Fresnel clearance, tree heights, minimum link distance (in order to identify duplicate locations in the input portfolios), etc. The backhaul analysis tool can use the analysis criteria to compute radio signal path profiles (i.e., properties of microwave links) between the centerpoints sites and any existing portfolio candidate site within the provided distance settings. The computed microwave link path profiles can be used to evaluate if any existing site captured within the backhaul search rings meets the criteria design goal (e.g., if there is a clear Line of Sight (LOS) between the new site and the existing site in the corresponding backhaul search ring). The backhaul analysis tool can display a bounding ring around the centerpoints (new sites), where the bounding ring encloses viable existing candidate sites found within the ring that have a clear LOS to the centerpoints. In some embodiments, the backhaul analysis tool can visually depict the bounding ring with a visual treatment based on whether the target number of viable backhaul links was met. In some embodiments, each displayed bounding ring can have a minimum radius necessary to enclose the specified target number of viable backhaul links identified per centerpoint.

In some embodiments, the wireless design and site backhaul analysis tool can visually depict the candidate sites to allow users of the tool to quickly assess the viability of certain backhaul links or conditions. For example, the analysis tool can modify the visual depiction of sites based on whether they meet the design goal (e.g., have a cleared path to the corresponding centerpoint), whether they are outside the maximum backhaul search area, whether they were not considered because a target number of viable links closer to the centerpoint was already identified, or whether they are duplicates or potential duplicates.

Various embodiments of the invention will now be described. The following description provides specific details for a thorough understanding and an enabling description of these embodiments. One skilled in the art will understand, however, that the invention can be practiced without many of these details. Additionally, some well-known structures or functions may not be shown or described in detail, to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is an illustration of a representative map 100 depicting path search rings 110a and 110b in which a wireless network operator (e.g., a cellular network operator) can search for viable locations to build new wireless sites or add equipment to existing sites to improve wireless coverage or capacity. A circular region or ring can be defined by a centerpoint 105, which specifies the map coordinates at the center point of the ring, and a radius of the ring. The location of the centerpoint 105 indicates the point at which the network operator needs to provide coverage or install a new wireless site. For example, path search rings 110a and 110b correspond to the centerpoint 105 where the radius 112a of the path search ring 110a is r1, and the radius 112b of the search ring 110b is r2. The larger the radius, the greater the path search area being analyzed. Sites 115a-f (represented by triangles) can be existing wireless sites (candidate sites) owned by the network operator. Additionally, or alternatively, the sites 115a-f can be potential sites available for acquisition or otherwise available for equipment collocation.

The path search rings (e.g., path search rings 110a and 110b) define the area that the network operator wishes to consider connecting their centerpoints into. For example, the path search ring radius can correspond to the maximum distance for reliable backhaul using radios operating at a certain frequency band, for a targeted data rate and reliability or fade margin. Once site acquisition specialists have identified potential sites within map 100 that can meet the operator's design goals and are available to the operator, the network operator needs to investigate how to interconnect the new sites into the operator's existing networks. For example, if a network operator were to install a new site at centerpoint 105, the network operator may wish to determine which of their existing sites (or accessible third party sites) within path search ring 110a they can backhaul a new site at centerpoint 105 into (if any). If, for example, reliable backhaul cannot be established using sites 115e or 115f in path search ring 110a, the network operator may wish to expand the path search ring to path search ring 110b to consider sites 115d or 115c as potential backhaul candidates. Because sites 115a and 115b fall outside the depicted path search rings, they would not be considered for backhaul analysis (e.g., they may be deemed too far for reliable wireless backhaul given the properties of the planned microwave backhaul radio technology).

Conventional backhaul site analysis tools perform site analysis using one path link at a time. For example, the user of a conventional site analysis tool can enter the portfolio of candidate sites (e.g., sites 115a-115f), a centerpoint (e.g., centerpoint 105), and individually run path link studies from each candidate site back to the centerpoint one at a time or, at best, one path area at a time. However, if the user wishes to consider a larger network deployment of new sites, they would need to repeat the analysis with a different search ring radius (e.g., radius r2) then every potential candidate site manually or simply only run the closest due to time constraints. Additionally, if the operator wishes to consider a different location on the map (e.g., no candidate sites were found within the specified search rings), the user would need to reenter the centerpoint and search ring radius and repeat the labor-intensive analysis. The user would need to repeat this process until viable candidate sites were identified which does not provide the network operations with the best resilient network, but rather, just an entangled connection. Repeating the process each time with different search rings can be potentially time consuming particularly for a dense portfolio of centerpoints and candidates.

In an embodiment of the disclosed technology, as will be described in additional detail below, a user can specify multiple centerpoints, a maximum path search ring radius for bounding search areas around each centerpoint, multiple candidate sites, and the desired number of target candidate path links per path search ring. Using this and other engineering design inputs, the site and backhaul analysis tool of the disclosed technology can evaluate multiple candidate sites in multiple path search rings and display the resulting bounding rings around the candidate sites for each path search ring. The tool can visually depict the bounding rings and candidate sites to allow easy evaluation of potential link candidates. In particular, the rings can have variable radiuses, with the radius of each ring appropriately sized according to the specified analysis criteria met for the number of links obtained.

Figure 2:
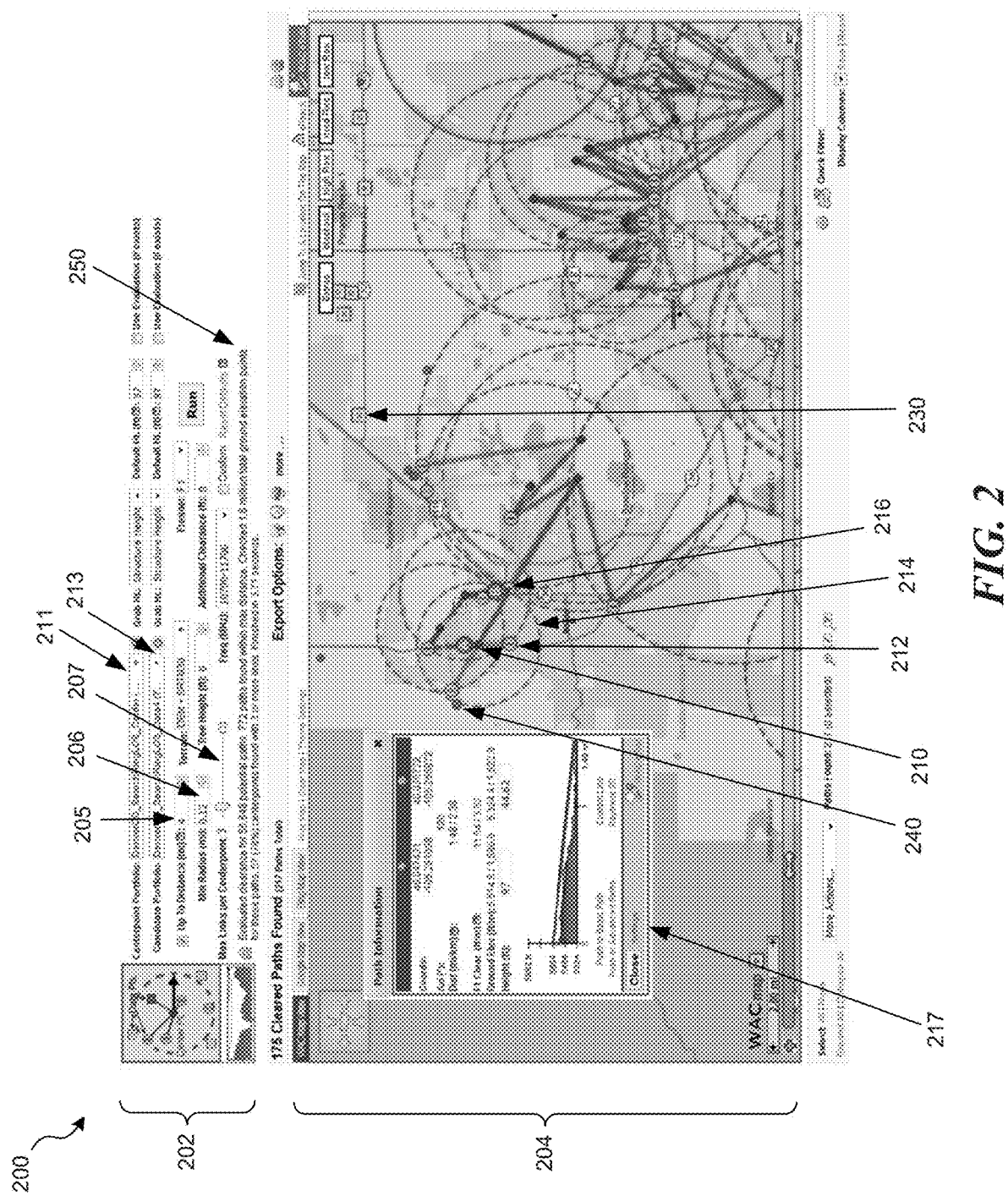
FIG. 2 is a representative user interface of a wireless design and site backhaul analysis tool.

FIG. 2 is a representative user interface 200 of a wireless design and site backhaul analysis tool. As will be discussed in additional detail herein, the tool can be realized as a web application via a web browser in client devices such as desktops, laptops, tablets, or other mobile devices. It can also be implemented as an executable application on a machine running Windows, Macintosh, Linux, or other operating systems. The user interface 200 of the tool can be divided into two sections 202 and 204. The first section 202 allows a user to specify datasets and parameters associated with a desired analysis. For example, the first section 202 presents an interface that allows a user to select a dataset associated with a centerpoint portfolio (e.g., selection menu 211 to input new sites being added into the operator's network) and an interface to select a dataset associated with a candidate portfolio (e.g., selection menu 213 to input data relating to existing deployed sites). To make such a selection, the selection menu 211 and 213 allows the user to browse for, and select, files containing properties of the centerpoint and candidate portfolios, including map coordinates of the candidates and centerpoints. The selected datasets can include data about the candidates and centerpoints, such as contained in the following representative table:

| Candidate ID | Geographic Coordinates | Structure Type | Height (Ft) |
| --- | --- | --- | --- |
| WAC-DEMO1 | 40.029514, −105.209237 | TOWER | 97 |
| WAC_DEMO2 | 39.878661, −105.143681 | POLE | 97 |

The first section 202 of the user interface 200 can include drop down menus, sliders, text entry boxes, or other input mechanisms to allow a user to input or select various design parameters and options for the analysis. For example, the first section 202, includes a control 205 that allows a user to specify a maximum path search ring radius and a control 206 that allows a user to specify a minimum search ring radius. Minimums are used to capture potential duplicate locations, or two points that are too close for a path. The user can specify the radius in miles, kilometers, or other common unit of measure. The first section 202 can also include a slider control 207 that allows the user to specify a maximum number of cleared paths desired. In the example depicted in FIG. 2, the user has specified a maximum of three links per centerpoint using slider control 207. In the disclosed technology, all possible paths are computed in the background and sorted to the user's current input. Finally, the first section 202 can include other controls that allow a user to specify a type of analysis (e.g., a line-of-sight only analysis or an analysis considering Fresnel zones), a frequency band of radio equipment, terrain model or models to use, tree heights or other additional clearance criteria, and other inputs for radio signal modeling. The first section 202 can also include an area 250 for runtime estimation notices and summaries.

The second section 204 of the user interface 200 depicts a graphical representation of the search ring path analysis results overlaid onto a map of the surrounding region. In the depicted interface, the second section 204 includes an aerial view of the centerpoints (e.g., centerpoint 210) and candidate sites (e.g., candidate sites 212 and 216). The centerpoints can be presented with a different graphical or visual treatment than the candidate sites. As will be described in additional detail with respect to FIG. 4 herein, the user interface 200 can also visually depicts path search rings or rings bounding cleared paths (e.g., bounding ring 214) as well as cleared and failed paths between the centerpoints and the candidate sites. The aerial view can be placed on a street or satellite view map. It will be appreciated that the use of two sections as described for user interface 200 is only representative, and other interfaces having windowing, pop-ups, or other GUI elements can be used to represent the data depicted in the two sections. Additionally, other GUI elements can be displayed in the user interface 200 such as a path information box 217 displaying information from a selected centerpoint site (e.g., centerpoint 210) to a selected candidate site (e.g., candidate site 216). As can be seen in the path information box 217, a clear line-of-sight path exists between centerpoint 210 (point A) and candidate site 217 (point B), hence the candidate site 217 is visually depicted to indicate that it represents a cleared path.

Figure 3:
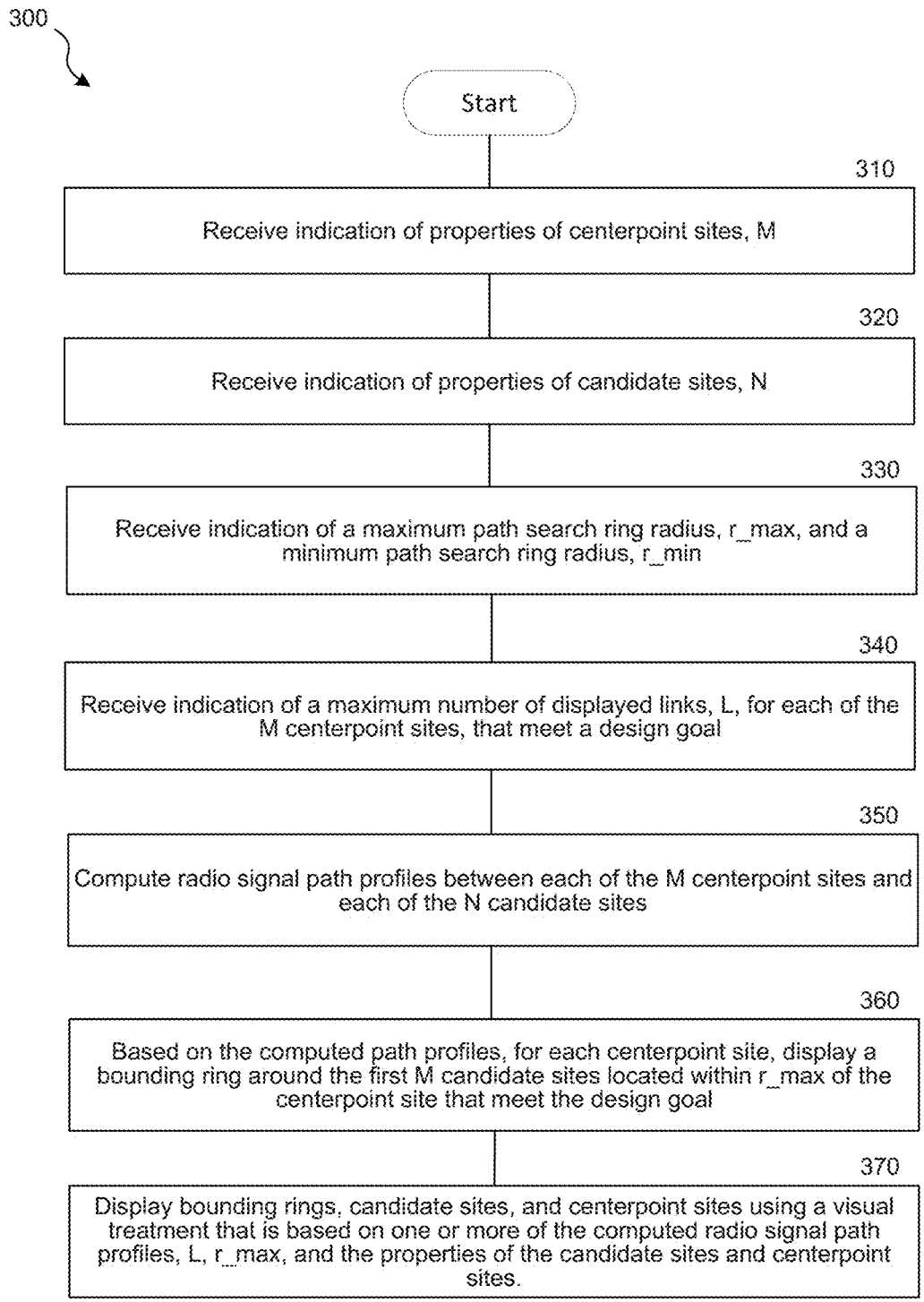
FIG. 3 is a representative flow diagram illustrating a method for evaluating candidate sites in expandable backhaul search rings.

FIG. 3 is a representative flow diagram 300 illustrating a method that is implemented by the path/backhaul analysis tool for evaluating candidate wireless sites using expandable path search rings to determine which sites are viable sites for new wireless deployments (e.g., which sites meet some design goals or criteria such as providing needed coverage or capacity backhaul). At block 310, the tool can receive an indication of the properties of M search ring centerpoints (M centerpoint sites). For circular path search rings, those properties can include the spatial locations and the radio design properties of transmitters/receivers located at the center of the path search rings, or properties of intended radio equipment to be deployed in new sites located at the centerpoint sites. For example, the tool can allow an operator or user of the tool to enter or identify a dataset of M centerpoints that includes M latitude and longitude coordinates of the centerpoints (or other property identifying the spatial location of each centerpoint), the height of existing or planned towers or elevation of the centerpoint (e.g., building height if centerpoint is on rooftop), the type of planned or existing structure at the centerpoint (e.g., a tower, pole, guyed tower, roof top, etc.), and an identifier of the centerpoint such as a name (useful for example for exporting results of sites determined to be viable to other design tools for additional analysis).

At block 320, the tool can receive an indication of the properties of N candidate sites that can represent an operator's existing sites or other potential sites where existing backhaul is available. The tool can allow an operator to identify a dataset of candidate sites such as by importing or accessing a file containing candidate site properties. Those properties can include latitudes/longitudes of the candidate sites, types of structures at the candidate site, height of existing towers or buildings at the candidate site, identifier of the candidate site, etc. The user can also enter these parameters for example in the user input interface of section 202 in FIG. 2. In some embodiments the type of parameters in the candidate dataset and the centerpoint datasets are the same; in others they are different.

At block 330, the tool can receive an indication of a maximum path search ring radius (r_max) and a minimum path search ring radius (r_min). In some embodiments, the user input interface of section 202 can include a selection box allowing a user to enter or select the maximum and minimum radius in miles or other distance units. The maximum and minimum path search radii are referenced from each centerpoint and specify the minimum path search area (minimum path search ring) and maximum path search area (maximum path search ring) around each centerpoint that is used to evaluate candidate sites for viability. Network specialists or users of the tool can use the rings defined by these radii to establish the minimum and maximum boundaries of their targeted search for backhaul potential from the new site locations or centerpoints. In some embodiments, the minimum path search ring radius may be fixed by the tool and the user can specify only the maximum path search ring radius.

It will be appreciated that, although the path search ring has been described here with reference to annular rings defined by radii, other shapes of path search areas are possible such as rectangular path search areas, oval path search areas, or path search areas with irregular bounding shapes. With non-circular path search areas, relevant dimensions specifying an area are provided to the tool to define the path search area around each centerpoint. In some embodiments the path search area is defined by a set of latitude/longitude coordinates bounding the area or other parameters defining the shape of the bounding region. For example, the path search area can exclude certain areas (e.g., parcels of land or candidate sites not preferred or available for backhaul).

At block 340, the tool can receive an indication of the maximum desired or target number of displayed links or radio signal paths, L, for each of the M centerpoint sites, that meet a wireless design criterion or goal (i.e., a target number of radio signal paths per centerpoint). In some embodiments, the tool receives an indication of the desired or target maximum number of cleared paths within each of the path search rings. For example, the maximum number of displayed paths that the user wishes to consider that have a line of sight (or other criteria such as certain percentage of Fresnel zone clearance, e.g., first Fresnel zone) between each centerpoint of the M centerpoints and each of the N candidate sites. For example, if a user selects a maximum number of links per centerpoint as three, then the user is interested in only the first three shortest paths between each centerpoint and candidate sites that meet the design criteria or goal (e.g., paths with clear unobstructed line-of-sight between the centerpoint and a candidate site). As will be described in more detail below, the tool can display a ring or other bounding region (e.g., a square, rectangular, ellipsoid, or other irregularly shaped bounding region) around the centerpoint encompassing the three identified candidate sites, for example, in the graphical user interface section 204 in FIG. 2.

At block 350, the tool computes a set of radio signal path profiles between each of the M path search ring centerpoints (centerpoint sites) and each of the N candidate sites. For example, the tool can compute the M×N path loss profiles between each of the M centerpoints and each of the N candidate sites considering pertinent radio propagation parameters entered or selected in section 202 of the user interface 200 (FIG. 2) or otherwise input into the tool. The radio propagation parameters can include, for example, the radio frequency band, the terrain and clutter in the path, the type and gain of antennas at each end, the ground elevation and tower heights, the desired amounts of Fresnel clearance, the relevant propagation model, among other parameters. A method of computing a path loss profile between two sites, considering terrain and clutter, can be found in U.S. Pat. No. 10,080,144, which is hereby incorporated by reference herein in its entirety. As will be described below, once the M×N path profiles are computed, a user of the tool can change the maximum path search ring radius entered at block 330 or the target maximum number links per centerpoint entered in block 340 and the tool can change the visual rendering of the resulting display without recomputing the path profiles. That is, by precomputing all path permutations, the tool can allow users to change the search criteria (e.g., path search ring radius or number of target links needed in each path search area) to suit the network planner's goals and quickly see the results of that analysis. The tool uses the computed radio signal path profiles to determine the minimum candidate sites in the path search ring that form links with the centerpoint in the path search ring, where the links meet the design goal (e.g., to determine the viable candidate sites forming unobstructed links with the centerpoint). The minimum candidate sites determined can be based on the desired target maximum links L entered in block 340. In some embodiments, the tool determines, based on the computed radio signal path profiles, all the candidate sites within the search ring that form a link meeting the design goal with the centerpoint.

At block 360, the tool uses the path profiles computed in block 350 to determine the radio signal paths or links in each path search area or path search ring that pass the design goal (e.g., the number of cleared paths with a clear unobstructed line of sight between a centerpoint site and a candidate site) and the radio signal paths that do not pass the design goal (e.g., there is an obstruction between the centerpoint site and the candidate site or the percentage clearance in the first Fresnel zone in path linking the centerpoint site and candidate site is below a predetermined threshold). Based on this determination, the tool can display a bounding region around each centerpoint, bounding the first L candidate sites that form links with the centerpoint in the path search ring that pass the design goal (i.e., the bounding region at least partially bounds the path search ring of radius r_max). For example, if L is set to three in block 340, the tool bounds the closest three (relative to centerpoint) candidate sites in the path search ring that have cleared paths. If enough candidates exist that satisfy the desired criteria, the bounding region or bounding ring can be less than or equal to the path search area (or can have a radius less than or equal to the radius of the path search ring). That is, rather than displaying a maximum search ring for each centerpoint, the tool displays only the path search ring or region bounding the desired target number of paths or candidates. The radius of the bounding region is approximately equal to the distance between the centerpoint in the path search ring and the furthest qualifying candidate site in the path search ring (i.e., the furthest candidate site within the path search ring that can form a link meeting the design goal or the candidate site that forms a radio signal path with the centerpoint that is longer than other radio signal paths in the path search ring that meet the design goal). If an insufficient number of candidates satisfy the desired criteria, the bounding region or bounding ring can be set equal to the maximum path search ring radius for each centerpoint and a visual indication presented to the user that the bound region failed to encompass the desired number of candidates. As will be described in more detail below, if the user of the tool changes the desired target number of displayed links, L, or the radius of the path search area, r_max, the tool can adjust the area of the bounding region without recomputing the radio signal path profiles computed in block 350.

In some embodiments, each bounding region or ring is determined by calculating the distance from an analyzed centerpoint to each qualifying candidate site, within the maximum path search area, associated with that centerpoint. The tool then selects the L candidate sites having the least distance to the centerpoint from among the qualifying candidate sites. The radius of each bounding region or ring is then set equal to or close to the distance of the selected candidate site (from the L candidate sites) having the farthest distance from the centerpoint. In some embodiments, the bounding region or ring has a radius that is at least greater than or equal to the minimum path search ring radius. In some embodiments, if there are no candidate sites within the path search ring that can form links that meet the design goal, no bounding ring or region is displayed.

At block 370, the tool can display the bounding regions or rings and some or all of the M centerpoints and the N candidate sites using a visual treatment that is based on one or more of the radio signal path profiles computed in block 350; the target or maximum number of desired links or candidates, L, entered in block 340; the maximum path search ring radius, r_max, entered in block 330; and, the properties of the centerpoints and candidate sites (e.g., the latitude/longitude coordinates) received in blocks 310 and 320.

The bounding region or ring bounds or encloses radio signal paths where the number of enclosed or bound radio signal paths is less than or equal to the target number of radio signal paths, L (i.e., the tool bounds as many paths that meet the design goal up to the specified target maximum paths per centerpoint). The bounding region or ring can be visually depicted using one visual treatment if the bounding region or ring bounds the target maximum number of radio signal paths L entered in block 340 and depicted using a different visual treatment if it bounds less than the maximum number of radio signal paths or links. For example, if the target number or links or candidate sites in a path search area is entered or selected in block 340 as three, and if the links corresponding to three or more candidate sites in the search area meet the design goal, the three candidate sites closest to the centerpoint are enclosed by the visually depicted bounding region indicating that the search criteria has passed (e.g., the tool can display a green ring to indicate that three candidate sites satisfy the desired criteria). If only one or two candidate sites within the path search ring form links that pass the design goal, the bounding region can be depicted to indicate that the search criteria failed (e.g., the tool can display a red ring enclosing the two passing candidate sites to indicate that three suitable sites were not found). For example, bounding ring 214 in FIG. 2 is visually depicted to indicate that it bounds the target number of candidate sites (selected using slider control 207 as three links per centerpoint). In some embodiments, if no radio links in the path search area meet the design goal, the maximum path search ring size can be displayed in red (failed), but still encompass the candidates that failed.

Additionally, a candidate site in the bounding ring displayed in block 360 can be visually rendered or displayed by the tool using a first visual treatment if the candidate site forms a link with a centerpoint in the bounding region meeting the design goal (e.g., forms a cleared path). For example, site 212 in FIG. 2 is visually depicted to indicate that the design goal was met (e.g., there is a cleared path between centerpoint site 210 and candidate site 212).

Additionally, a candidate site can be displayed using a second visual treatment if the candidate site forms a link with a centerpoint in the bounding region not meeting the design goal (e.g., forms an obstructed or failed path).

Additionally, a candidate site outside the bounding ring can be displayed using a third visual treatment if the candidate site is at a distance away from a centerpoint that is greater than the maximum path search ring radius, r_max (i.e., the candidate site falls outside the r_max path search ring). That is, the visual rendering can indicate which candidate sites were not considered because they were further away from a centerpoint than the maximum path search ring radius entered in block 330. For example, site 230 in FIG. 2 falls well outside of the maximum path search ring radius of any displayed path search rings.

Additionally, a candidate site outside the bounding ring can be displayed using a fourth visual treatment if the candidate site is at a distance less than the maximum path search ring radius, r_max. That is, the candidate site can be displayed using a different visual treatment indicating that the candidate site was not included because the target number of desired links L had already been met (e.g., the design goal was otherwise met for the excluded candidate). For example, if the maximum number of links per centerpoint is set to three and a candidate site is within r_max of a centerpoint (is within the path search ring), it could be visually rendered to indicate that it could have been included or considered but it was not selected because three closer candidate sites were already identified and the links displayed in the path search ring. For example, site 240 in FIG. 2 is within the path search ring but not selected.

Additionally, the tool can display a candidate site using a fifth visual treatment if a latitude and longitude of the candidate site is approximately equal to a latitude and longitude of a centerpoint in the M centerpoints received in block 310. That is, the tool can visually depict duplicates (e.g., centerpoints and candidates separated by a distance less than a predetermined minimum radius) in the centerpoint database and the site databases (e.g., two or more centerpoints with the same/close map coordinates, two or more candidate sites with the same/close map coordinates, or centerpoints with the same/close map coordinates to candidate sites).

Additionally, or alternatively, the tool can display a candidate site using a sixth visual treatment if a distance between the candidate and a centerpoint in the M centerpoints received in block 310 is less than or equal to a predetermined threshold. For example, an operator might not realize that they already own or lease a site at or very close to a centerpoint and therefore no backhaul is needed because new service can be collocated on the existing site. The visual rendering with the fifth and sixth visual treatments can alert the user of the tool that there is a duplication in the centerpoints entered or selected in block 310 and the candidates entered or selected in block 320 or between the two database portfolios. Although the latitude/longitude coordinates are not approximately equal, the centerpoint and candidate can still be referencing the same site if the distance between the two is less than a predetermined amount (e.g., a minimum radius). For example, if the two evaluated locations are less than say x meters, a user can conclude based on the sixth visual treatment that there is a potential duplication of that location.

It will be appreciated that other methods of entering the required input data (e.g., spatial locations of centerpoints and candidate sites, path search ring radii, target number of links per centerpoint, etc.) into the tool are possible including, for example, importing the input data directly from other tools.

Figure 4:
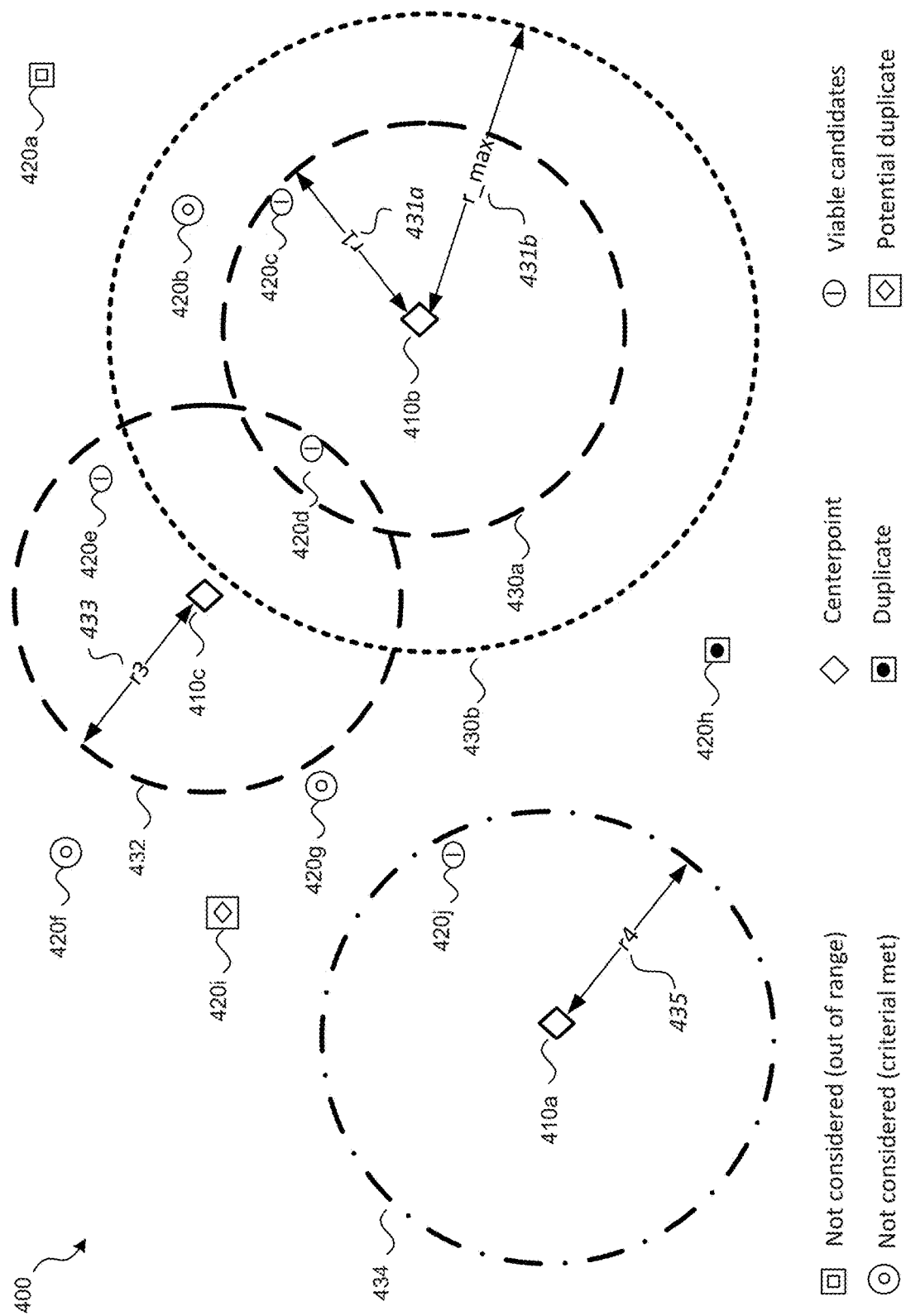
FIG. 4 is an illustrative display showing viable candidate sites (existing sites) with expandable backhaul search rings around centerpoint sites (new sites).

FIG. 4 is an illustrative display 400 showing viable candidate sites in expandable path search rings around centerpoints. For example, the user of the tool can enter (in block 310 of FIG. 3) the map coordinates of centerpoints or new sites (e.g., centerpoints 410a, 410b, and 410c) and can enter (in block 320 of FIG. 3) the map coordinates of candidate sites (e.g., candidate sites 420a-420j). If, for example, the maximum path search ring radius is set to r_max (in block 330 of FIG. 3), and the maximum number of links per centerpoint is set to two (in block 340 of FIG. 3), the tool can display a bounding ring 430a bounding site 420c and 420d where r_max is greater than radius 431a (r1). That is, the tool bounds the required minimum two sites within the path search ring 430b of radius r_max that meet the link design goal with a bounding ring 430a (e.g., both sites 420c and 420d have a clear line of sight to centerpoint 410b). The radius r1 of the bounding ring 430a is equal to the distance between centerpoint 410b and candidate site 420c because candidate site 420c is the further of the two viable candidate sites within the r_max path search ring 430b (target number of viable sites set to two in block 340 of FIG. 3).

The tool can visually depict sites 420c and 420d to indicate that they meet the design goal and can visually depict bounding ring 430a to indicate that it bounds sites within the r_max path search ring 430b that meet the design goal. The tool can also visually depict site 420b to indicate that it was not included because the criteria was already met (i.e., the target number of links or viable sites was set to two and two viable sites have already been identified in the r_max search ring).

The tool can bound sites 420d and 420e with a bounding ring 432 with radius 433 of r3 (where r3 is less than r_max) to indicate that sites 420d and 420e have a clear line of sight to a corresponding centerpoint 410c. Sites 420f and 420g can be visually depicted to indicate that they were not included because the target number of viable sites was found within an r_max path search ring (not shown in FIG. 4) around centerpoint 410c. Additionally, the tool can visually depict site 420a to indicate that it was excluded because it was outside an r_max search ring (i.e., is located a distance greater than r_max from the centerpoint 410b or centerpoint 410c).

If a user of the tool changes the target number of maximum links L per centerpoint to three, the bounding ring 430a can expand to bound site 420b (if site 420b has a clear line of sight to centerpoint 410b). Additionally, if the user increases the maximum path search ring radius r_max to cover site 420*a*, the tool can consider site 420*a* and include it in a bounding ring depending on the target number of maximum links per centerpoint that has been specified, and if there is a clear line of sight to site 420*a* from a centerpoint. In some embodiments, the tool does not recompute the path profiles between each centerpoint and each candidate site (as in block 350 of FIG. 3) but instead reuses the prior computed path profiles to determine the new viable candidate sites given these new user inputs. As a result, the tool is quickly able to re-display bounding rings as a user changes the target number of maximum links, maximum path search ring radius, or minimum path search ring radius.

In some embodiments, the tool can visually depict the bounding rings to indicate whether the bounding rings bound the specified target number of maximum links per centerpoint. For example, the tool can bound centerpoint 410*a* with a bounding ring 434 to indicate that only one viable candidate site 420*j* was identified in the r_max path search ring centered on centerpoint 410*a* when at least two viable candidates were required. In some embodiments, the bounding ring radius 435 r4 can be set to r_max to indicate that the r_max path search ring was evaluated. In other embodiments, the bounding ring radius 435 r4 can be set to the distance between viable candidate site 420*j* and centerpoint 410*a* to indicate the furthest viable candidate site meeting the path search criteria was evaluated (with no viable candidates available beyond site 420*j* in the ring bound by r4 and r_max).

The tool can also visually depict duplicate sites (e.g., site 420*h*) and potential duplicate sites (e.g., site 420*i*) as discussed above in relation to FIG. 3.

Figure 5:
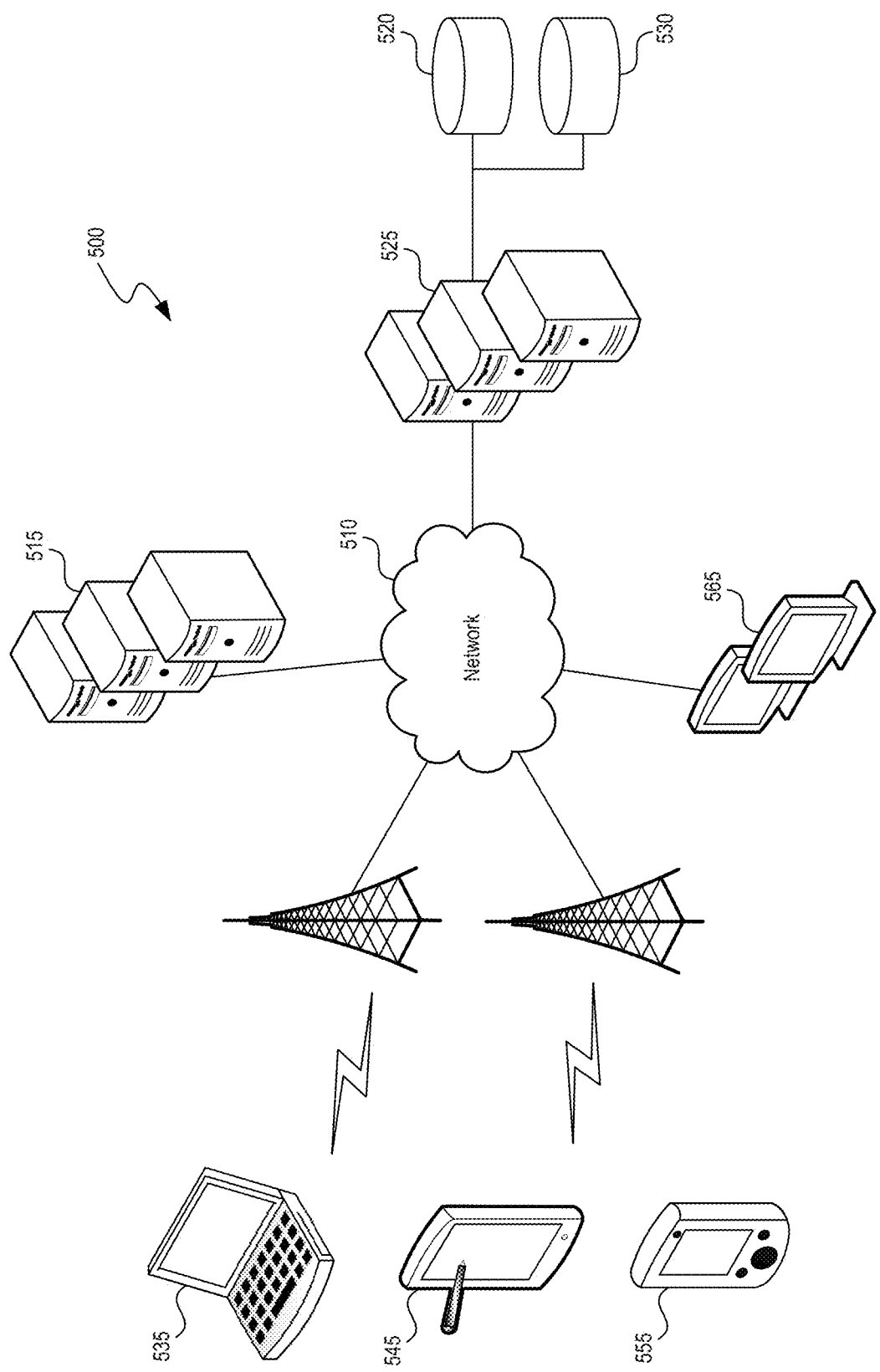
FIG. 5 is a representative environment in which the wireless design and site backhaul analysis tool can operate.

FIG. 5 and the following discussion provide a brief, general description of a suitable environment in which a wireless design and site backhaul analysis tool can operate. Although not required, aspects of the invention are described in the general context of computer-executable instructions, such as routines executed by a general-purpose computer, a personal computer, a server, or other computing system. The tool can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or any combination of such components. Computer-executable instructions may also be stored in one or more storage devices, such as magnetic or optical-based disks, flash memory devices, or any other type of non-volatile storage medium or non-transitory medium for data. A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes, modules and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Aspects of the wireless design and site analysis tool can be practiced in distributed computing environments, where tasks or modules are performed by remote processing devices, which are linked through a communication network, such as a Local Area Network ("LAN"), Wide Area Network ("WAN"), or the Internet.

Referring to the example of FIG. 5, a representative environment 500 in which aspects of the described technology can operate include one or more client computing devices 535, 545, 555, and 565 capable of running a web browser of other desktop of server application, and servers 515 and 525, capable of interacting with a web server and remotely communicating with the client computing devices. The client computing devices communicate with the servers through network 510 including, for example, the Internet.

Aspects of the wireless design and site analysis tool can be practiced by the client computing devices 535, 545, 555, and 565 and server devices 515 and 525. For example, client computing devices can run a web browser to login to a web application on a web server hosted on the server devices 515 and 525, provide user input via the web browser to configure the site analysis input parameters as needed, and trigger the computation of radio signal path profile computation on the web application tool or at the web server. The web application implementing the design and site analysis tool, or the web server serving the web application, can obtain additional input data from third party storage devices or servers 520 and 530. These storage devices can also be connected to the web server or client devices through the network 510 or can be warehoused locally on the server computers 515 and 525, or on the client devices 535, 545, 555, and 565. Such input data can include, for example, USGS NED 30- or 10-meter terrain, National Land Cover Database (NLCD/Clutter) data, Light Detection and Ranging (LIDAR) data, and Federal Communication Commission (FCC) Microwave and other Sourced data.

REMARKS

The figures and above description provide a brief, general description of a suitable environment in which the invention can be implemented. Although not required, aspects of the invention can be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations. The terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules can be in both local and remote memory storage devices. Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations can perform routines having steps/blocks, or employ systems having blocks, in a different order, and some processes or blocks can be deleted, moved, added, subdivided, combined, or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further any specific numbers noted herein are only examples: alternative implementations can employ differing values or ranges.

These and other changes can be made to the invention in light of the above Detailed Description. While the above description describes certain examples of the invention, and describes the best mode contemplated, no matter how detailed the above appears in text, the invention can be practiced in many ways. Details of the system can vary considerably in its specific implementation, while still being encompassed by the invention disclosed herein. As noted above, terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A method implemented on a computing system for evaluating coverage of wireless sites, the method comprising:

receiving an indication of properties of a plurality of centerpoint sites, wherein centerpoint sites reflect locations where potential new wireless sites are desired;

receiving an indication of properties of a plurality of candidate sites, wherein candidate sites include existing wireless sites capable of providing backhaul to one or more new wireless sites;

receiving an indication of a target number of radio signal paths per centerpoint site of the plurality of centerpoint sites, each radio signal path meeting a first design goal between a respective centerpoint site and one of the plurality of candidate sites;

computing a first set of radio signal path profiles between each one of the plurality of centerpoint sites and each one of the plurality of candidate sites; and determining, for each one of the plurality of centerpoint sites and based on the first set of radio signal path profiles, a first number of radio signal paths that meet the first design goal.

2. The method of claim 1, further comprising is displaying a bounding region around each one of the plurality of centerpoint sites, wherein:

each of the bounding regions bounds the first number of radio signal paths that meet the first design goal when the first number of radio signal paths that meet the first design goal is less than or equal to the target number of radio signal paths; and each of the bounding regions bounds the target number of radio signal paths that meet the first design goal and a second design goal when the first number of radio signal paths that meet the first design goal is greater than the target number of radio signal paths.

3. The method of claim 2, wherein the second design goal is based on a length of a radio signal path between the respective centerpoint site and the one of the plurality of candidate sites.

4. The method of claim 1, wherein the first design goal comprises a clear line of sight between the respective centerpoint site and the one of the plurality of candidate sites.

5. The method of claim 1, wherein the first design goal comprises a percentage of Fresnel zone clearance in a radio signal path between the respective centerpoint site and the one of the plurality of candidate sites.

6. The method of claim 1, wherein the properties of the plurality of centerpoint sites and the properties of the plurality of candidate sites include, for each centerpoint site and each candidate site, latitude and longitude coordinates, a type of structure, an identifier, and/or a height.

7. The method of claim 1, further comprising:

receiving an indication of dimensions of a path search ring around each one of the plurality of centerpoint sites, wherein receiving the indication of dimensions of the path search ring comprises receiving an indication of a minimum and/or a maximum path search ring radius; and displaying a bounding region around a first centerpoint site of the plurality of centerpoint sites.

8. The method of claim 7, wherein:

the bounding region comprises a radius approximately equal to a distance between the first centerpoint site and a first candidate site in the path search ring;

a radio signal path of the first set between the first centerpoint site and the first candidate site in the path search ring is a first radio signal path;

the first radio signal path meets the first design goal;

the first radio signal path is longer than or equal to other radio signal paths in the path search ring that meet the first design goal; and the radius is greater than or equal to the minimum path search ring radius and less than or equal to the maximum path search ring radius.

9. The method of claim 7, further comprising:
displaying a candidate site of the plurality of candidate sites in the bounding region using a visual treatment that indicates that a first radio signal path of the first set between the first centerpoint site and the candidate site meets the first design goal.

10. The method of claim 7, further comprising:
displaying a candidate site of the plurality of candidate sites using a visual treatment that indicates that a first radio signal path of the first set between the first centerpoint site and the candidate site does not meet the first design goal.

11. The method of claim 7, further comprising:
displaying a candidate site of the plurality of candidate sites outside the bounding region using a visual treatment that indicates that the candidate site is located at a distance from the first centerpoint site greater than the maximum path search ring radius.

12. The method of claim 7, further comprising:
displaying a candidate site of the plurality of candidate sites outside the bounding region using a fourth visual treatment that indicates that the candidate site is at a distance from the first centerpoint site less than the maximum path search ring radius.

13. The method of claim 7, further comprising:
displaying a candidate site of the plurality of candidate sites using a visual treatment that indicates that latitude and longitude coordinates of the candidate site are approximately equal to latitude and longitude coordinates of a centerpoint site of the plurality of centerpoint sites.

14. The method of claim 7, further comprising:
displaying a candidate site of the plurality of candidate sites using a visual treatment that indicates that a distance between the candidate site and a first centerpoint site in the plurality of centerpoint sites is less than or equal to a predetermined threshold.

15. The method of claim 1, further comprising:
receiving an indication of a maximum path search ring radius around each one of the plurality of centerpoint sites;
determining a bounding region around each one the plurality of centerpoint sites, wherein an area of each of the bounding regions is less than or equal to an area of the path search ring that is based on the maximum path search ring radius, and wherein each of the bounding regions is based on the first set of radio signal path profiles;
receiving an indication of an updated maximum path search ring radius; and
without recomputing radio signal path profiles between each one of the plurality of centerpoint sites and each one of the plurality of candidate sites, determining a new bounding region around each one the plurality of centerpoint sites,
wherein an area of each of the new bounding regions is less than or equal to an area of a new path search ring that is based on the updated maximum path search ring radius, and
wherein each of the new bounding regions is based on the first set of radio signal path profiles.

16. The method of claim 1, further comprising:
determining a bounding region around each of the plurality of centerpoint sites, wherein each of the bounding regions encloses a first plurality of radio signal paths, and wherein a total number of radio signal paths in the first plurality of radio signal paths is less than or equal to the target number of radio signal paths,
receiving an indication of an updated target number of radio signal paths per centerpoint site that meet the first design goal;
without recomputing radio signal path profiles between each one of the plurality of centerpoint sites and each one of the plurality of candidate sites, determining a new bounding region around each one the plurality of centerpoint sites; and
displaying at least one of the new bounding regions,
wherein the at least one of the new bounding regions is displayed using a visual treatment to indicate when the new bounding region bounds the updated target number of radio signal paths, and
wherein the new bounding region is based on the first set of radio signal path profiles.

17. The method of claim 16, wherein each of the new bounding regions encloses a second plurality of radio signal paths, and wherein a total number of radio signal paths in the second plurality of radio signal paths is less than or equal to the updated target number of radio signal paths.

18. The method of claim 1, wherein the candidate sites of the plurality of candidates sites further include potential sites available for acquisition or available for equipment collocation.

19. At least one non-transitory computer-readable medium storing instructions that, when executed by a processor in a computing system, cause the computing system to perform a method for evaluating coverage of wireless sites, the method comprising:
receiving an indication of a first plurality of spatial locations of a plurality of centerpoint sites, wherein centerpoint sites reflect locations where potential new wireless sites are desired;
receiving an indication of a second plurality of spatial locations of a plurality of candidate sites, wherein candidate sites include existing wireless sites capable of providing backhaul to one or more new wireless sites;
receiving an indication of a radius of a path search ring around each of the plurality of centerpoint sites;
receiving an indication of a target number of links in each path search ring that meet a design goal;
computing radio signal path profiles between each of the plurality of centerpoint sites and each of the plurality of candidate sites; and,
determining, based on the computed radio signal path profiles, a number of links in each path search ring that meet the design goal.

20. The at least one non-transitory computer-readable medium of claim 19, wherein the method further comprises:
displaying a bounding ring around each of the plurality of centerpoint sites, wherein:
each of the bounding rings is displayed with a first visual treatment when the bounding ring encloses the target number of links, and
each of the bounding rings is displayed with a second visual treatment when the bounding ring encloses less than the target number of links.

* * * * *